US010989565B2

(12) United States Patent
Rufener

(10) Patent No.: US 10,989,565 B2
(45) Date of Patent: Apr. 27, 2021

(54) TIMEPIECE MOVEMENT COMPRISING A DEVICE FOR DETECTING AN ANGULAR POSITION OF A WHEEL

(71) Applicant: ETA SA Manufacture Horlogere Suisse, Grenchen (CH)

(72) Inventor: Rene Rufener, Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 414 days.

(21) Appl. No.: 16/045,799

(22) Filed: Jul. 26, 2018

(65) Prior Publication Data

US 2019/0041239 A1 Feb. 7, 2019

(30) Foreign Application Priority Data

Aug. 4, 2017 (EP) .................................. 17184981

(51) Int. Cl.
*G01D 5/241* (2006.01)
*G04C 3/14* (2006.01)
*G04C 3/00* (2006.01)

(52) U.S. Cl.
CPC ........... *G01D 5/2417* (2013.01); *G04C 3/008* (2013.01); *G04C 3/14* (2013.01)

(58) Field of Classification Search
CPC .......... G04C 3/14; G04C 3/146; G04C 3/002; G01D 5/2412; G01D 5/2417
See application file for complete search history.

(56) References Cited

U.S. PATENT DOCUMENTS 5,077,635 A * 12/1991 Bollhagen ............ G01D 5/2412
361/287
5,910,781 A * 6/1999 Kawamoto .......... G01D 5/2405
318/662

(Continued)

FOREIGN PATENT DOCUMENTS

| CH | 710 522 A2 | 6/2016 |
| EP | 3 037 899 A1 | 6/2016 |

OTHER PUBLICATIONS

European Search Report dated Feb. 5, 2018 in European Application 17184981.3 filed on Aug. 4, 2017 (with English Translation of Categories of Cited Documents).

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A timepiece movement including an analogue display, including a rotary indicator and a wheel secured in rotation to the rotary indicator, the wheel including a roller including a location element, a device for detecting at least one angular position of the location element, including a plate fixed relative to the roller, extending substantially parallel to the roller, and on which are arranged a first electrode, a second electrode and a common electrode positioned between the first electrode and the second electrode the electrodes being planar and being arranged in such a way that, in an angular position of the wheel, the location element is located above at least a portion of each electrode, the first electrode and the second electrode having the form of two segments of a ring centred on the intersection between the axis of the wheel and the plate.

7 Claims, 1 Drawing Sheet

(56) References Cited

U.S. PATENT DOCUMENTS

| | | | |
|---|---|---|---|
| 6,218,803 B1* | 4/2001 | Montagu | G01D 5/2405 |
| | | | 318/652 |
| 6,307,814 B1* | 10/2001 | Farine | G04C 3/14 |
| | | | 368/187 |
| 10,310,452 B2* | 6/2019 | Lagorgette | G04C 3/14 |
| 2003/0030570 A1* | 2/2003 | Netzer | G01D 11/245 |
| | | | 340/870.37 |
| 2004/0081028 A1* | 4/2004 | Yiu | G04C 3/14 |
| | | | 368/185 |
| 2005/0002277 A1* | 1/2005 | Fukuda | G04C 17/0066 |
| | | | 368/80 |
| 2008/0018596 A1* | 1/2008 | Harley | G06F 3/044 |
| | | | 345/157 |
| 2016/0178402 A1 | 6/2016 | Klopfenstein et al. | |
| 2017/0185045 A1 | 6/2017 | Lagorgette et al. | |

* cited by examiner

TIMEPIECE MOVEMENT COMPRISING A DEVICE FOR DETECTING AN ANGULAR POSITION OF A WHEEL

This application claims priority from European Patent Application No. 17184981.3 filed on Aug. 4, 2017; the entire disclosure of which is incorporated herein by reference

TECHNICAL FIELD

The invention relates to the field of timepiece movements provided with an analogue display and at least one wheel secured in rotation to a rotary indicator of this analogue display. The invention relates more particularly to the devices for detecting the angular position of such a wheel, in order to determine the angular position of the rotary indicator.

PRIOR ART

Devices are known for detecting at least one angular position of a wheel belonging to a watch movement. In particular, the application EP15202349.5 discloses a detection device of which a part is schematically illustrated in FIG. 1. The device comprises a printed circuit board PA, fixed relative to the mainplate of the movement, and arranged parallel to the wheel MB. The plate PA comprises three planar electrodes, called first electrode E1, second electrode E2 and common electrode Em. The electrodes have the form of segments of one and the same ring, the common electrode Em being placed between the first electrode E1 and the second electrode E2. The wheel MB, for its part, comprises an electrically conductive roller PT pierced by an aperture OV. The aperture OV is arranged so as to be able to successively be located, when the wheel MB performs a rotation, facing only the first electrode E1, then the first electrode E1 and the common electrode Em, then all three electrodes, then the common electrode Em and the second electrode E2, and finally only the second electrode E2.

The detection device also comprises an electronic circuit making it possible to impose potentials on the first electrode E1, the second electrode E2 and the common electrode Em. According to this circuit, pulsed voltages are applied to the first electrode E1 and to the second electrode E2 so as to alternately charge the first electrode E1 and the second electrode E2: the first electrode E1 is maintained at a high potential while the second electrode is maintained at a low potential, then vice versa. The common electrode Em is, for its part, maintained at an intermediate potential which is, advantageously, the mean of the high potential and of the low potential.

Given that the first electrode E1 and the common electrode Em comprise lateral edges that are close to and facing one another, that they are at different potentials and that the potential of the first electrode E1 is variable, a capacitive coupling is effected between these two electrodes: the capacitance between these two electrodes is called first capacitance C1. Likewise, given that the second electrode E2 and the common electrode Em comprise lateral edges that are close to and facing one another, that they are at different potentials and that the potential of the second electrode is variable, a capacitive coupling is effected between these two electrodes: the capacitance between these two electrodes is called second capacitance C2.

These capacitances C1, C2 see their values vary as a function of the position of the aperture OV of the wheel: when the aperture OV is simultaneously above the first electrode E1 and the common electrode Em, the first capacitance C1 is maximal since the wheel does not intersect any electrical field line between the first electrode E1 and the common electrode Em. Likewise, when the aperture is simultaneously above the second electrode E2 and the common electrode Em, the second capacitance C2 is maximal since the wheel does not intersect any electrical field line between the second electrode E2 and the common electrode Em.

The electronic circuit also comprises an electronic setup connected to the common electrode Em. The electronic setup makes it possible to measure $(C2-C1)/(C1+C2)$ as a function of the position of the aperture, when the wheel MB performs a rotation. A curve obtained from these measurements by linear interpolation, is illustrated in FIG. 2. As has been explained previously, this curve reaches a minimum when the first electrode E1 and the common electrode Em only are fully facing the aperture OV, and a maximum when the common electrode Em and the second electrode E2 only are fully facing the aperture OV.

To avoid a capacitive coupling between the roller PT of the wheel MB and the common electrode Em, which would disturb the measurements, the roller PT is maintained at a fixed potential, advantageously a nil potential, applied to the roller PT via the shaft of the wheel. However, when the watch is worn, shocks or abrupt movements can cause poor electrical contacts, and the potential of the shaft and consequently of the roller can then fluctuate. That is the source of a stray capacitance, formed between the roller PT and the common electrode Em. This stray capacitance varies with the variations of shake of the wheel (that is to say the variations of distance between the common electrode Em and the wheel MB).

SUMMARY OF THE INVENTION

The present invention aims to reduce the capacitive coupling between the common electrode Em and the roller PT of the wheel MB, without significantly altering the coupling between the common electrode Em and the electrodes E1 and E2.

To this end, the subject of the invention is a timepiece movement as defined in claim 1.

The particular form of the common electrode makes it possible to reduce its coupling with the roller without affecting its coupling with the first electrode and with the second electrode.

The coupling between the first electrode and the common electrode is made between the lateral edge of the first electrode and the first branch of the common electrode, while the coupling between the second electrode and the common electrode is made between the lateral edge of the second electrode and the second branch of the common electrode. These couplings do not depend on the thickness of the branches, but only on their length of opposite positioning between the first and the second electrode, and the distance which separates them. The coupling of the common electrode with the first electrode and with the second electrode is not therefore affected. On the contrary, the coupling between the common electrode and the roller depends on the total surface of the common electrode, this surface has therefore been minimized by virtue of the openwork form of the common electrode.

In a particular embodiment, the timepiece movement comprises the features defined in claim 2.

This configuration is particularly advantageous for limiting the coupling between the common electrode and another metal element of the timepiece movement (for example, another wheel) which would be located in proximity to the top ends of the branches. Indeed, the opposite positioning between the common electrode and such a metal element is minimized by virtue of the maximum separation between the central portion and the element.

In a particular embodiment, the timepiece movement comprises the features defined in claim 3.

This configuration is particularly advantageous for limiting the coupling between the common electrode and the shaft of the wheel. Indeed, the opposite positioning between the common electrode and the shaft is minimized, and the central portion is separated to the maximum from the element by virtue of the maximum separation between the central portion and the shaft.

In a particular embodiment, the timepiece movement comprises the features defined in claim 4.

This configuration offers the advantages of the preceding two embodiments: it makes it possible to limit the coupling between the common electrode and another metal element of the timepiece movement (for example, another wheel) which would be located in proximity to the top ends of the branches, but also to limit the coupling between the common electrode and the shaft of the wheel.

In a particular embodiment, the timepiece movement comprises the features defined in claims 5, 6 and/or 7.

BRIEF DESCRIPTION OF THE FIGURES

Other features and advantages of the present invention will become apparent on reading about several forms of execution given purely as nonlimiting examples and given with reference to the attached drawings in which.

DETAILED DESCRIPTION OF EMBODIMENTS

Figure 1:
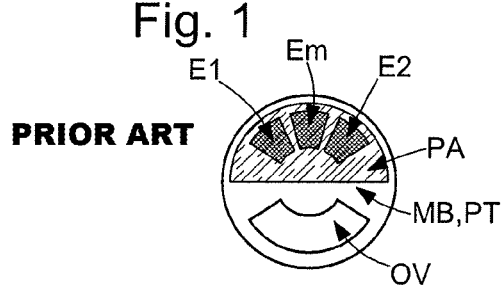
FIG. 1, already described, represents a wheel and a part of a device for detecting the angular position of the wheel according to the prior art, the detection device comprising a plate on which a first electrode, a second electrode and a common electrode are arranged FIG. 2, already described, represents a curve showing (C2−C1)/(C1+C2) as a function of the angle of rotation of the wheel, where C1 is the capacitance between the first electrode and the common electrode, and C2 is the capacitance between the second electrode and the common electrode
Figure 2:
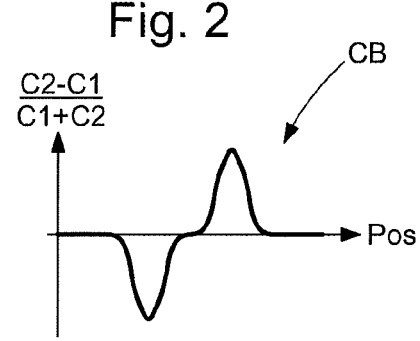
Figure 3:
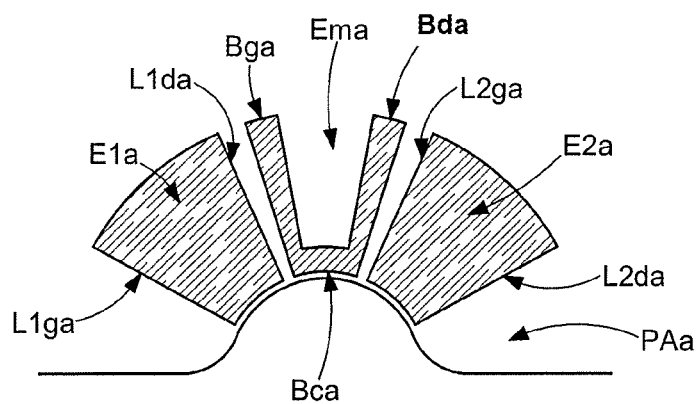
FIG. 3 represents the first electrode, the second electrode and a common electrode according to a first embodiment of the invention, arranged on a plate of a device for detecting the angular position of a wheel
Figure 4:
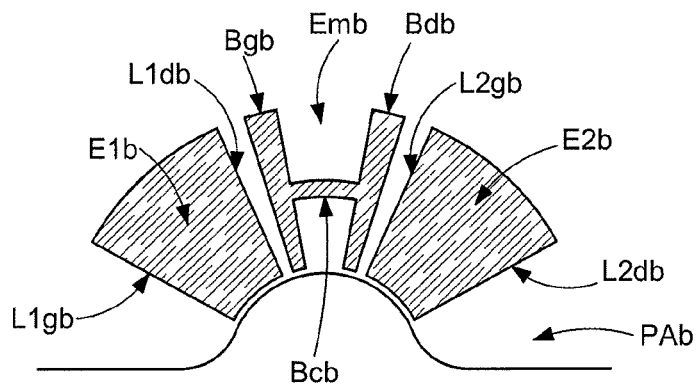
FIG. 4 represents the first electrode, the second electrode and a common electrode according to a second embodiment of the invention, arranged on a plate of a device for detecting the angular position of a wheel
Figure 5:
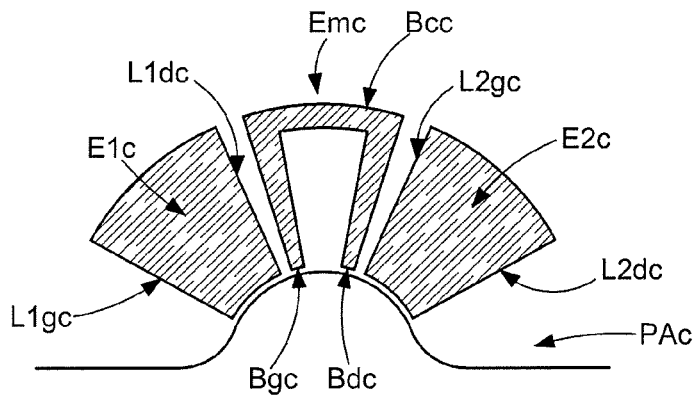
FIG. 5 represents the first electrode, the second electrode and a common electrode according to a third embodiment of the invention, arranged on a plate of a device for detecting the angular position of a wheel.

FIGS. 3, 4 and 5 respectively illustrate a plate PAa according to a first embodiment of the invention, a plate PAb according to a second embodiment of the invention and a plate PAc according to a third embodiment of the invention to replace the plate PA already described with reference to the prior art. Hereinafter in the description, the suffix 'x' replaces 'a', 'b' or 'c' without distinction.

The plate PAx comprises a first electrode E1$x$, a second electrode E2$x$ and a common electrode Em$x$, all three planar. The first electrode E1$x$ and the second electrode E2$x$ of the plate PAx are of a form similar to the first electrode E1 and to the second electrode E2 of the plate PA: they have the form of segments of one and the same ring having for its centre the intersection between the plate PAx and the axis of the wheel MB. The first electrode E1$x$, respectively the second electrode E2$x$, thus comprises two lateral edges L1$gx$, L1$dx$, respectively L2$gx$, L2$dx$, extending radially relative to a circle whose centre would be the intersection between the plate PAx and the axis of the wheel MB. The first electrode E1$x$, respectively the second electrode E2$x$, also comprises two edges, each extending in a circular arc, and linking the lateral edges L1$gx$, L1$dx$, respectively L2$gx$, L2$dx$.

The common electrode Em$x$ is arranged between the first electrode E1$x$ and the second electrode E2$x$. The common electrode Em$x$ is composed of three portions, more specifically a first branch Bg$x$, a second branch Bd$x$, and a central portion Bc$x$ linking the first branch Bg$x$ and the second branch Bd$x$. The first branch Bg$x$ and the second branch Bd$x$ extend radially, relative to a circle whose centre would be the intersection between the plate PAx and the axis of the wheel MB. The first branch Bg$x$ and the second branch Bd$x$ are of substantially equal lengths. The first branch Bg$x$ extends facing the first electrode E1$x$, and the second branch Bd$x$ extends facing the second electrode E2$x$. The central portion Bc$x$ extends in a circular arc between the first branch Bg$x$ and the second branch Bd$x$.

The capacitance C1$x$ between the first electrode E1$x$ and the common electrode Em$x$ depends on the mean deviation between the lateral edge L1$dx$ of the first electrode E1$x$ and the edge of the first branch Bg$x$ of the common electrode Em$x$ located on the side of the first electrode E1$x$. The capacitance C1$x$ depends also on the length of the lateral edge L1$dx$ of the first electrode E1$x$, which is also the length of the first branch Bg$x$. As for the capacitance C2$x$ between the second electrode E2$x$ and the common electrode Em$x$, it depends on the mean deviation between the lateral edge L2$gx$ of the second electrode E2$x$ and the edge of the second branch Bd$x$ of the common electrode Em$x$ located on the side of the second electrode E2$x$. The capacitance C2$x$ depends also on the length of the lateral edge L2$gx$ of the second electrode E2$x$, which is also the length of the second branch Bd$x$. Note therefore that the three forms of the common electrode given by way of example in this description have virtually no impact on the coupling between the first electrode and the common electrode on the one hand, and between the common electrode and the second electrode on the other hand, relative to the form of the common electrode according to the prior art. Furthermore, the surface of the common electrode, in each of the three examples, is lesser compared to the surface of the common electrode according to the prior art. The coupling between the common electrode and the wheel is thus reduced.

Moreover, in the first embodiment, the central portion Bc1 links the ends of the first branch Bg1 and of the second branch Bd1 located closest to the intersection between the plate PA1 and the axis of the wheel MB. In the second embodiment, the central portion Bc2 links the mid-points of the first branch Bg2 and of the second branch Bd2. In the third embodiment, the central portion Bc3 links the ends of the first branch Bg3 and of the second branch Bd3 located furthest away from the intersection between the plate PA3 and the axis of the wheel MB. The position of the central portion has an impact on the coupling between the common electrode and the shaft of the wheel on the one hand, and on the other hand on the coupling between the common electrode and another metal element of the movement (for example a wheel or a shaft) which would be located in proximity to the ends of the first branch Bg3 and of the second branch Bd3 located furthest away from the intersection between the plate PA3 and the axis of the wheel MB. In the first embodiment, the coupling between the common electrode and the other metal element is minimized. In the third embodiment, the coupling between the common electrode and the shaft of the wheel is minimized. The second embodiment results from a trade-off between these two couplings.

It will be understood that various modifications and/or enhancements and/or combinations that are obvious to the person skilled in the art can be applied to the different embodiments of the invention explained above without departing from the scope of the invention defined by the attached claims. For example, the central portion Bcx could extend between points other than the ends or the mid-points of the branches Bgx, Bdx. It could also not extend in a circular arc.

Moreover, it will be noted that the aperture OV in the roller PT of the wheel MB could be replaced by an element of the same geometry as the aperture, made of a material having a dielectric permittivity different form that of the rest of the roller PT and different from that of air. That in no way alters the principle of the invention. To generalize, the aperture or such an element is therefore called "location element".

What is claimed is:

1. A timepiece movement comprising:
   an analogue display, comprising a rotary indicator and a wheel secured in rotation to said rotary indicator, said wheel comprising a roller including a location element,
   a device for detecting at least one angular position of the location element, comprising a plate fixed relative to the roller, extending substantially parallel to the roller, and on which are arranged a first electrode, a second electrode and a common electrode positioned between the first electrode and the second electrode, the electrodes being planar and being arranged in such a way that, in an angular position of the wheel, the location element is located above at least a portion of each electrode, the first electrode and the second electrode having the form of two segments of a ring centred on the intersection between the axis of the wheel and the plate,
   wherein the common electrode comprises two branches, a first branch extending radially facing a lateral edge of the first electrode, a second branch extending radially facing a lateral edge of the second electrode, and a central portion linking the two branches, radially extending relative to a circle which would be centred on the intersection between the axis of the wheel and the plate.

2. The timepiece movement according to claim 1, wherein the central portion extends between the ends of the first branch and of the second branch closest to the axis of the wheel, called bottom ends.

3. The timepiece movement according to claim 1, wherein the central portion extends between the ends of the first branch and of the second branch furthest away from the axis of the wheel, called top ends.

4. The timepiece movement according to claim 1, wherein the central portion extends between mid-points of the first branch and of the second branch.

5. The timepiece movement according to claim 1, wherein the central portion has the form of a segment of a ring centred on the intersection between the axis of the wheel and the plate.

6. The timepiece movement according to claim 1, wherein the location element is an aperture passing through the roller of the wheel.

7. The timepiece movement according to claim 1, wherein the location element is made of a material whose dielectric permittivity is different from that of the rest of the roller and of air.

* * * * *